(12) United States Patent
Xu

(10) Patent No.: US 12,071,135 B2
(45) Date of Patent: Aug. 27, 2024

(54) METHOD, APPARATUS AND COMPUTER PROGRAM PRODUCT FOR AUTONOMOUS VEHICLE MANAGEMENT AT UNSIGNALIZED INTERSECTIONS

(71) Applicant: HERE GLOBAL B.V., Eindhoven (NL)

(72) Inventor: Jingwei Xu, Buffalo Grove, IL (US)

(73) Assignee: HERE Global B.V., Eindhoven (NL)

( * ) Notice: Subject to any disclaimer, the term of this patent is extended or adjusted under 35 U.S.C. 154(b) by 268 days.

(21) Appl. No.: 17/454,292

(22) Filed: Nov. 10, 2021

(65) Prior Publication Data
US 2023/0192089 A1    Jun. 22, 2023

(51) Int. Cl.
*B60W 30/18* (2012.01)
*B60W 60/00* (2020.01)

(52) U.S. Cl.
CPC .... *B60W 30/18154* (2013.01); *B60W 30/181* (2013.01); *B60W 30/18159* (2020.02); *B60W 60/0015* (2020.02); *B60W 2520/10* (2013.01); *B60W 2554/402* (2020.02); *B60W 2554/4046* (2020.02); *B60W 2555/20* (2020.02)

(58) Field of Classification Search
CPC ................................................ G08G 1/096783
See application file for complete search history.

(56) References Cited

U.S. PATENT DOCUMENTS

| 4,847,618 A * | 7/1989 | Baustin ................. G08G 1/096 340/916 |
| 7,647,180 B2 | 1/2010 | Breed |
| 10,229,592 B1 | 3/2019 | Elsheemy |
| 2010/0004839 A1* | 1/2010 | Yokoyama ....... G08G 1/096783 701/70 |
| 2012/0068860 A1* | 3/2012 | Popovic ........... G08G 1/096783 340/905 |
| 2013/0015983 A1* | 1/2013 | Goudy .................. G08G 1/164 340/905 |

(Continued)

OTHER PUBLICATIONS

Kang et al., "Lane-Level Map-Matching Method for Vehicle Localization Using GPS and Camera on a High-Definition Map", Sensors vol. 20, No. 8, (Apr. 2020), 22 pages.

(Continued)

*Primary Examiner* — Ryan Rink
(74) *Attorney, Agent, or Firm* — Alston & Bird LLP

(57) ABSTRACT

Embodiments described herein may provide a method for management of vehicles at intersections. Methods may include: receiving probe data from probe apparatuses proximate an intersection between two or more road segments; identifying a first vehicle approaching the intersection from the probe data; determining, for the first vehicle approaching the intersection, a safe stop distance, where the safe stop distance includes a distance to stop the first vehicle from a current speed of the first vehicle; generating a warning message in response to the safe stop distance of the first vehicle being greater than a distance of the first vehicle from the intersection; and providing the warning message to one or more other vehicles approaching, at, or within the intersection, where the warning message provides an indication that the first vehicle cannot safely stop before entering the intersection.

20 Claims, 7 Drawing Sheets

(56) References Cited

U.S. PATENT DOCUMENTS

| | | | |
|---|---|---|---|
| 2013/0282357 A1* | 10/2013 | Rubin | G08G 1/0969 |
| | | | 703/22 |
| 2016/0328975 A1* | 11/2016 | Tokita | G06V 20/584 |
| 2017/0243485 A1* | 8/2017 | Rubin | H04W 4/46 |
| 2017/0301237 A1* | 10/2017 | MacNeille | H04W 68/005 |
| 2017/0337819 A1* | 11/2017 | Wei | G08G 1/166 |
| 2019/0035270 A1 | 1/2019 | Astigarraga et al. | |
| 2019/0304308 A1 | 10/2019 | Wei et al. | |
| 2019/0311617 A1* | 10/2019 | Karaoguz | G08G 1/096783 |
| 2020/0086859 A1 | 3/2020 | McGill et al. | |

OTHER PUBLICATIONS

Zamanipour, "A Unified Decision Framework for Multi-Modal Traffic Signal Control Optimization in a Connected Vehicle Environment", The University of Arizona Dissertations, (2016), 188 pages.

"Wikipedia—Braking Distance", Retrieved on Feb. 7, 2022, Retrieved from the Internet: <URL: https://en.wikipedia.org/wiki/Braking_distance>, (Oct. 25, 2020), 7 pages.

\* cited by examiner

| Vehicle speed (kph) | Perception distance (meters) | Brake distance (meters) | Normal weather condition Full stop distance (meters) | Rain condition Full stop distance (meters) | Snow/Ice condition Full stop distance (meters) |
|---|---|---|---|---|---|
| 20 | 6 | 6 | 12 | 24 | 60 |
| 30 | 9 | 14 | 23 | 46 | 115 |
| 40 | 12 | 24 | 36 | 72 | 180 |
| 50 | 15 | 38 | 53 | 106 | 265 |
| 60 | 18 | 55 | 73 | 146 | 365 |
| 70 | 21 | 75 | 95 | 190 | 475 |

FIG. 3

| Vehicle speed (kph) | Perception distance (meters) | Brake distance (meters) | Normal weather condition Full stop distance (meters) | Rain condition Full stop distance (meters) | Snow/Ice condition Full stop distance (meters) |
|---|---|---|---|---|---|
| 20 | 6 | 9 | 15 | 30 | 75 |
| 30 | 9 | 21 | 30 | 60 | 150 |
| 40 | 12 | 36 | 48 | 84 | 240 |
| 50 | 15 | 57 | 72 | 144 | 360 |
| 60 | 18 | 83 | 111 | 222 | 555 |
| 70 | 21 | 113 | 134 | 268 | 670 |

FIG. 4

METHOD, APPARATUS AND COMPUTER PROGRAM PRODUCT FOR AUTONOMOUS VEHICLE MANAGEMENT AT UNSIGNALIZED INTERSECTIONS

TECHNOLOGICAL FIELD

An example embodiment of the present invention relates generally to management of autonomous vehicles at unsignalized intersections, and more particularly, to improve the safety of unsignalized intersections using vehicle sensor information and safe stop data for vehicles approaching the unsignalized intersection.

BACKGROUND

Road networks include a plurality of roads within a geographic area that intersect at intersections. Intersections may have two or more roads that meet or cross. Intersections include those that are categorized as signalized intersections, which are controlled by traffic signals, with each traffic signal having signal phase and timing for transitioning between green and red-light phases. The signal phase and timing control strategy can be periodic, relying solely on fixed time intervals for each phase. The signal phase and timing control strategy can further be dynamic, relying on time of day, direction of traffic flow, visual feedback of queued traffic, sensor detection of queued traffic, or the like. Unsignalized intersections are intersections that are not controlled by a traffic signal. Unsignalized intersections can include yield signs, stop signs, or lack any traffic control devices. Intersections with flashing red or flashing yellow lights are considered unsignalized, as the signals lack phase and timing, as the red flashing lights equate to stop signs, with yellow flashing lights equating to caution signs.

Unsignalized intersections can include partial stop (e.g., two of four intersecting road segments have stop signs), yield controlled (e.g., at least one road segment including a yield sign), and all-way stop controlled (e.g., where all intersecting road segments have stop signs). Unsignalized intersections further include roundabouts, where every road segment approaching the roundabout intersection has a yield sign. The majority of intersections are unsignalized. From a safety perspective, unsignalized intersections have a higher proportion of accidents. The lack of discrete signals with signal phase and timing presents challenges to autonomous vehicles and semi-autonomous vehicles traversing an intersection.

BRIEF SUMMARY

A method, apparatus, and computer program product are therefore provided for management of autonomous vehicles at unsignalized intersections, and more particularly, to improve the safety of unsignalized intersections using vehicle sensor information and safe stop data for vehicles approaching the unsignalized intersection. An apparatus may be provided including at least one processor and at least one non-transitory memory including computer program code instructions, the computer program code instructions may be configured to, when executed, cause the apparatus to at least: receive probe data from probe apparatuses proximate an intersection between two or more road segments; identify a first vehicle approaching the intersection from the probe data; determine, for the first vehicle approaching the intersection, a safe stop distance, where the safe stop distance includes a distance to stop the first vehicle from a current speed of the first vehicle; generate a warning message in response to the safe stop distance of the first vehicle being greater than a distance of the first vehicle from the intersection; provide the warning message to one or more other vehicles approaching, at, or within the intersection, where the warning message provides an indication that the first vehicle cannot safely stop before entering the intersection; and cause the one or more other vehicles approaching, at, or within the intersection to take action responsive to the warning.

According to some embodiments, causing the one or more other vehicles approaching, at, or within the intersection to take action responsive to the warning includes causing the one or more other vehicles to perform at least one of: stopping before entering the intersection, accelerating out of the intersection, slowing before entering the intersection, or waiting at the intersection for the first vehicle to traverse the intersection. Causing the apparatus to determine, for the first vehicle approaching the intersection, the safe stop distance, includes causing the apparatus of some embodiments to: determine weather conditions proximate the intersection; and determine, for the first vehicle approaching the intersection, the safe stop distance based, at least in part, on the weather conditions proximate the intersection. Causing the apparatus to determine, for the first vehicle approaching the intersection, the safe stop distance, includes causing the apparatus of some embodiments to determine the safe stop distance for the first vehicle approaching the intersection based on maximum applied braking for the first vehicle.

According to some embodiments, causing the apparatus to determine, for the first vehicle approaching the intersection, the safe stop distance, includes causing the apparatus to: determine, for the first vehicle, information associated with the first vehicle; and determine, based on the information associated with the first vehicle, the safe stop distance for the first vehicle. The information associated with the first vehicle includes, in some embodiments, at least one of: vehicle type, vehicle model, vehicle weight, or vehicle load status, where causing the apparatus to determine, based on the information associated with the first vehicle, the safe stop distance for the first vehicle, includes causing the apparatus of some embodiments to determine the safe stop distance from a database using the information associated with the first vehicle. Causing the apparatus to provide the warning message to one or more other vehicles approaching, at, or within the intersection includes causing the apparatus of some embodiments to: activate a traffic control device proximate the intersection to inform the one or more other vehicles approaching the intersection of the warning message.

Embodiments provided herein include a computer program product including at least one non-transitory computer-readable storage medium having computer-executable program code instructions stored therein, the computer-executable program code instructions including program code instructions to: receive probe data from probe apparatuses proximate an intersection between two or more road segments; identify a first vehicle approaching the intersection from the probe data; determine, for the first vehicle approaching the intersection, a safe stop distance, where the safe stop distance includes a distance to stop the first vehicle from a current speed of the first vehicle; generate a warning message in response to the safe stop distance of the first vehicle being greater than a distance of the first vehicle from the intersection; provide the warning message to one or more other vehicles approaching, at, or within the intersection, where the warning message provides an indication that the first vehicle cannot safely stop before entering the intersection; and cause the one or more other vehicles approaching, at, or within the intersection to take action responsive to the warning.

According to some embodiments, the program code instructions for causing the one or more other vehicles approaching, at, or within the intersection to take action responsive to the warning includes program code instructions for causing the one or more other vehicles to perform at least one of: stopping before entering the intersection, accelerating out of the intersection, slowing before entering the intersection, or waiting at the intersection for the first vehicle to traverse the intersection. The program code instructions to determine, for the first vehicle approaching the intersection, the safe stop distance, includes program code instructions of some embodiments to: determine weather conditions proximate the intersection; and determine, for the first vehicle approaching the intersection, the safe stop distance based, at least in part, on the weather conditions proximate the intersection. The program code instructions to determine, for the first vehicle approaching the intersection, the safe stop distance, includes program code instructions of some embodiments to determine the safe stop distance for the first vehicle approaching the intersection based on maximum applied braking for the first vehicle.

According to some embodiments, the program code instructions to determine, for the first vehicle approaching the intersection, the safe stop distance, includes program code instructions to: determine, for the first vehicle, information associated with the first vehicle; and determine, based on the information associated with the first vehicle, the safe stop distance for the first vehicle. The information associated with the first vehicle includes, in some embodiments, at least one of: vehicle type, vehicle model, vehicle weight, or vehicle load status, where the program code instructions to determine, based on the information associated with the first vehicle, the safe stop distance for the first vehicle, includes program code instructions of some embodiments to determine the safe stop distance from a database using the information associated with the first vehicle. The program code instructions to provide the warning message to one or more other vehicles approaching, at, or within the intersection includes program code instructions of some embodiments to: activate a traffic control device proximate the intersection to inform the one or more other vehicles approaching the intersection of the warning message.

Embodiments provided herein include a method including: receiving probe data from probe apparatuses proximate an intersection between two or more road segments; identifying a first vehicle approaching the intersection from the probe data; determining, for the first vehicle approaching the intersection, a safe stop distance, where the safe stop distance includes a distance to stop the first vehicle from a current speed of the first vehicle; generating a warning message in response to the safe stop distance of the first vehicle being greater than a distance of the first vehicle from the intersection; providing the warning message to one or more other vehicles approaching, at, or within the intersection, where the warning message provides an indication that the first vehicle cannot safely stop before entering the intersection; and causing the one or more other vehicles approaching, at, or within the intersection to take action responsive to the warning.

According to some embodiments, causing the one or more other vehicles approaching, at, or within the intersection to take action responsive to the warning includes causing the one or more other vehicles to perform at least one of: stopping before entering the intersection, accelerating out of the intersection, slowing before entering the intersection, or waiting at the intersection for the first vehicle to traverse the intersection. Determining, for the first vehicle approaching the intersection, the safe stop distance, includes, in some embodiments: determining weather conditions proximate the intersection; and determining, for the first vehicle approaching the intersection, the safe stop distance based, at least in part, on the weather conditions proximate the intersection. According to some embodiments, determining, for the first vehicle approaching the intersection, the safe stop distance, includes determining the safe stop distance for the first vehicle approaching the intersection based on maximum applied braking for the first vehicle.

According to some embodiments, determining, for the first vehicle approaching the intersection, the safe stop distance, includes: determining, for the first vehicle, information associated with the first vehicle; and determining, based on the information associated with the first vehicle, the safe stop distance for the first vehicle. The information associated with the first vehicle includes, in some embodiments, at least one of: vehicle type, vehicle model, vehicle weight, or vehicle load status, where determining, based on the information associated with the first vehicle, the safe stop distance for the first vehicle, includes in some embodiments determining the safe stop distance from a database using the information associated with the first vehicle. Providing the warning message to one or more other vehicles approaching, at, or within the intersection includes in some embodiments: activating a traffic control device proximate the intersection to inform the one or more other vehicles approaching the intersection of the warning message.

Embodiments provided herein include an apparatus including: means for receiving probe data from probe apparatuses proximate an intersection between two or more road segments; means for identifying a first vehicle approaching the intersection from the probe data; means for determining, for the first vehicle approaching the intersection, a safe stop distance, where the safe stop distance includes a distance to stop the first vehicle from a current speed of the first vehicle; means for generating a warning message in response to the safe stop distance of the first vehicle being greater than a distance of the first vehicle from the intersection; means for providing the warning message to one or more other vehicles approaching, at, or within the intersection, where the warning message provides an indication that the first vehicle cannot safely stop before entering the intersection; and means for causing the one or more other vehicles approaching, at, or within the intersection to take action responsive to the warning.

According to some embodiments, the means for causing the one or more other vehicles approaching, at, or within the intersection to take action responsive to the warning includes means for causing the one or more other vehicles to perform at least one of: stopping before entering the intersection, accelerating out of the intersection, slowing before entering the intersection, or waiting at the intersection for the first vehicle to traverse the intersection. The means for determining, for the first vehicle approaching the intersection, the safe stop distance, includes, in some embodiments: means for determining weather conditions proximate the intersection; and means for determining, for the first vehicle approaching the intersection, the safe stop distance based, at least in part, on the weather conditions proximate the intersection. According to some embodiments, the means for determining, for the first vehicle approaching the intersection, the safe stop distance, includes means for determining the safe stop distance for the first vehicle approaching the intersection based on maximum applied braking for the first vehicle.

According to some embodiments, the means for determining, for the first vehicle approaching the intersection, the safe stop distance, includes: means for determining, for the first vehicle, information associated with the first vehicle; and means for determining, based on the information associated with the first vehicle, the safe stop distance for the first vehicle. The information associated with the first vehicle includes, in some embodiments, at least one of: vehicle type, vehicle model, vehicle weight, or vehicle load status, where the means for determining, based on the information associated with the first vehicle, the safe stop distance for the first vehicle, includes in some embodiments means for determining the safe stop distance from a database using the information associated with the first vehicle. The means for providing the warning message to one or more other vehicles approaching, at, or within the intersection includes in some embodiments: means for activating a traffic control device proximate the intersection to inform the one or more other vehicles approaching the intersection of the warning message.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
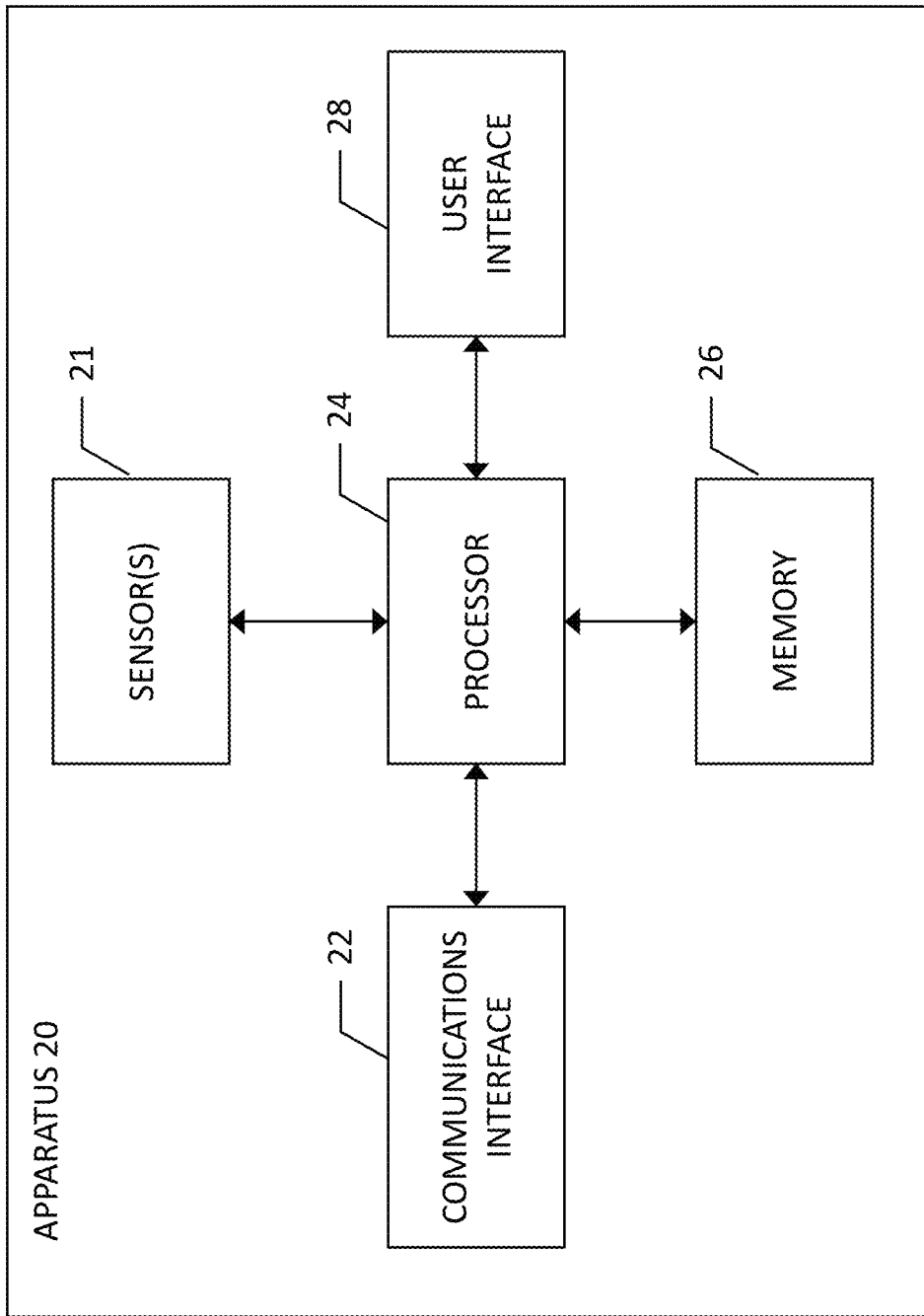
Figure 2:
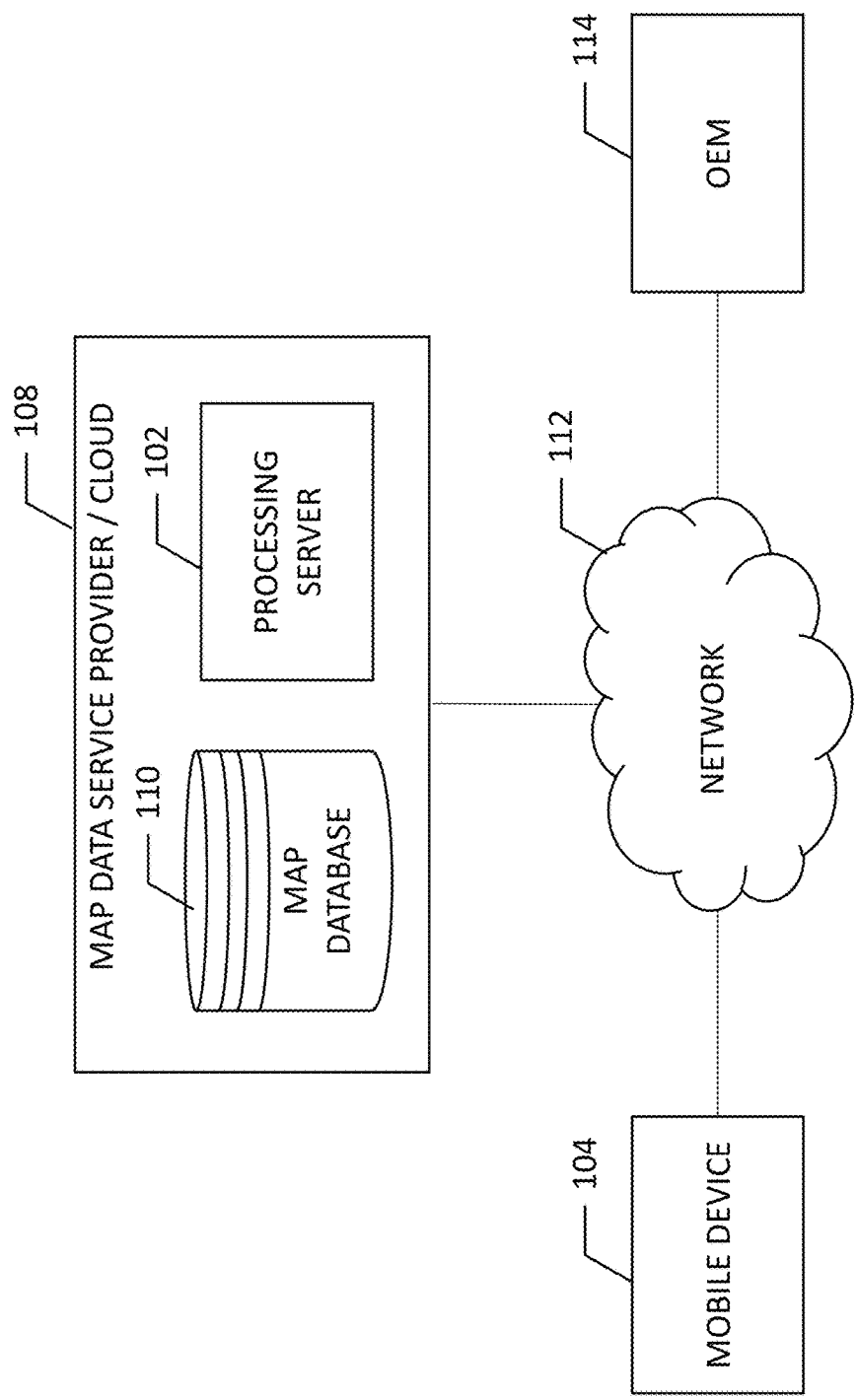
Figure 5:
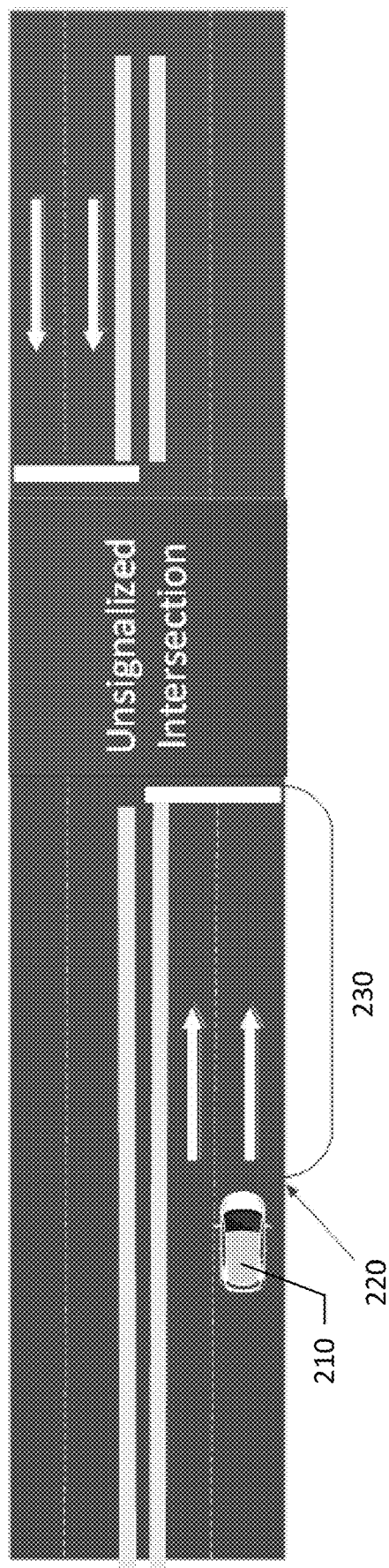
Figure 6:
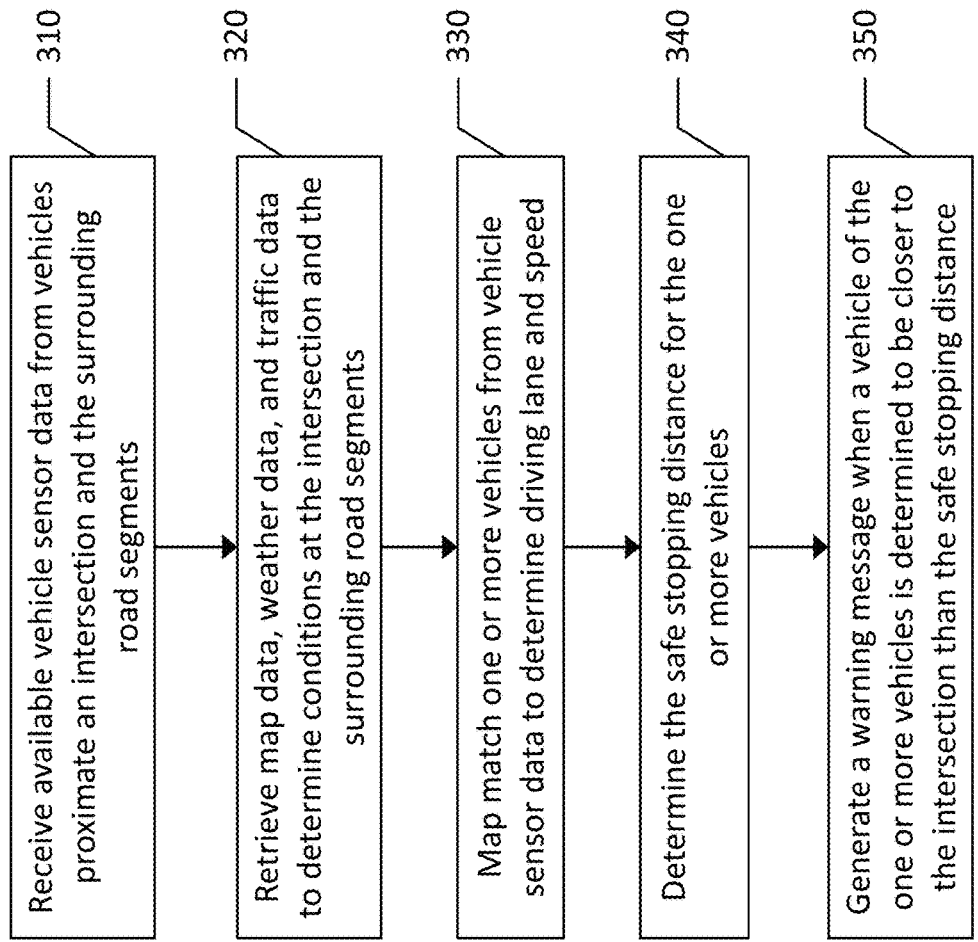
Figure 7:
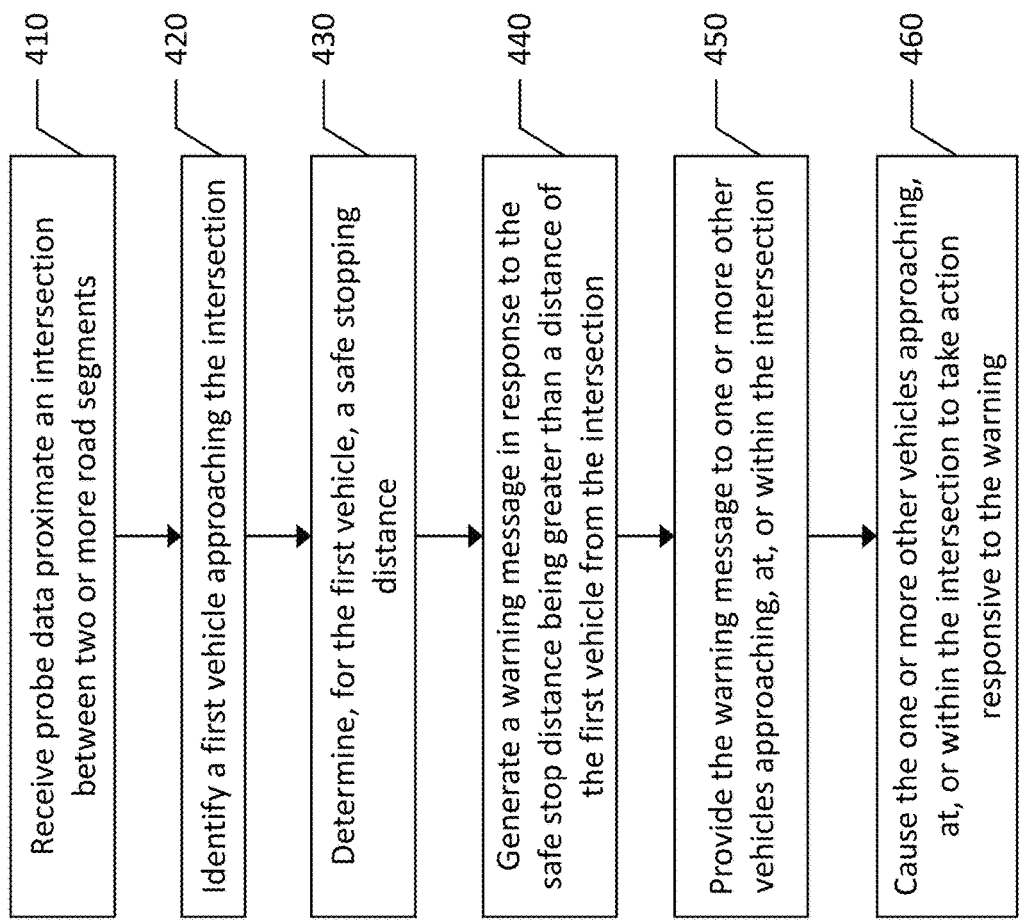

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for improving the safety of unsignalized intersections using vehicle sensor information and safe stop data for vehicles approaching the unsignalized intersection according to an example embodiment of the present disclosure;

FIG. 3 illustrates a table of vehicle safe stopping distances for a first type of vehicle according to an example embodiment of the present disclosure;

FIG. 4 illustrates a table of vehicle safe stopping distances for a second type of vehicle according to an example embodiment of the present disclosure;

FIG. 5 is a diagram of a vehicle approaching an intersection at speed according to an example embodiment of the present disclosure;

FIG. 6 is a flowchart of a method to improve the safety of intersections using vehicle sensor information and safe stop data for vehicles approaching the intersection according to an example embodiment of the present disclosure; and FIG. 7 is a flowchart of another method to improve the safety of intersections using vehicle sensor information and safe stop data for vehicles approaching the intersection according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present invention for managing autonomous vehicles at unsignalized intersections, and more particularly, to improve the safety of unsignalized intersections using vehicle sensor information and safe stop data for vehicles approaching the unsignalized intersection. In this regard, according to certain embodiments, user interface of a device, such a mobile device or a device affixed to a vehicle, such as to a dashboard or the like, may provide intersection-related warnings to a user in the form of a visual and/or auditory warnings, which may aid the user in safely traversing the intersection. According to other embodiments described herein, vehicles with at least semi-autonomous control can receive alerts and warnings and take action responsive to the warnings. Such action may include, for example, automatic braking, accelerating, delaying entry into an intersection, etc.

An intersection, as described herein, includes any location where two or more road segments meet, merge, or cross. Signalized intersections include intersections controlled by active traffic signals that have a signal phase and timing control strategy. Unsignalized intersections include intersections not controlled by a traffic signal, but may include stop signs, yield signs, or possibly no traffic control devices. While embodiments described herein are generally intended for unsignalized intersections, embodiments can be employed in signalized intersections to improve safety thereof, particularly when traffic signals are ignored, are not functioning, or other unpredictable scenarios.

Provided herein is a method, apparatus, and computer program product to use probe data from vehicles in the vicinity of intersections to improve the safety of those intersections. Embodiments employ high definition (HD) maps, vehicle-to-vehicle communication, and vehicle-to-cloud communication for intersection management. Probe apparatuses embodied by vehicles provide probe data including sensor data collected from sensors of the probe apparatus to enable embodiments described herein. The probe data is map matched to identify the location of a vehicle relative to roads and intersections of a road network, and from this location and probe data, embodiments described herein can manage intersection traffic and improve the safety of intersections.

Vehicles traveling within a road network generate probe data that includes location, which can be map-matched to road segments and lanes thereof, and additional information such as speed among a variety of other sensor data. Vehicles differ in terms of manufacturer, model, engine/motor, weight, etc. Therefore, vehicles perform differently and have different performance capabilities. For example, lighter vehicles can generally stop faster than heavy vehicles. Embodiments described herein use a safe stop distance to improve the safety of intersections. The safe stop distance is a distance that relates directly to the speed of a vehicle. The faster a vehicle is traveling, the longer the distance it will take that vehicle to stop. The safe stop distance of individual vehicles is employed herein to determine when a vehicle is too close to an intersection to safely stop and to use that information to inform other vehicles at or approaching the intersection such that they can take action as necessary. Warnings regarding vehicles approaching intersections that cannot safely stop can be provided to other vehicles approaching or at an intersection via a user interface, such as using a navigation user interface or infotainment system. Warnings can also be provided to a vehicle controller that provides semi-autonomous or fully-autonomous vehicle control.

In example embodiments, a navigation system or infotainment user interface may be provided for driver assistance for a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like.

Autonomous and semi-autonomous vehicles are classified according to the Society of Automotive Engineers (SAE) to include six distinct levels of autonomy ranging from Level 0 to Level 5. In Level 0, a vehicle may provide warnings and may momentarily intervene (e.g., anti-lock braking or stability control), but has no sustained vehicle control. Level 1 autonomy includes a "hands on" control, where the driver and the automated system share control of the vehicle. Examples include adaptive cruise control (ACC) where the driver controls steering and the automated system controls speed. The driver must be ready to retake full control at any time with Level 1 autonomy. Level 2 autonomy is "hands off" control, where the system takes full control of the vehicle including accelerating, braking, and steering. The driver must monitor the driving and be prepared to intervene at any time if the automated system fails to respond properly. A driver may be required to maintain hands on a steering wheel in this level of autonomy despite the name as the driver must be ready to intervene when appropriate.

Level 3 vehicle autonomy includes "eyes off" whereby a driver can safely turn their attention away from the driving tasks. For example, a driver of a Level 3 autonomous vehicle can watch a movie or use a mobile device. While the vehicle will handle situations that call for immediate response like emergency braking, the driver must be prepared to intervene within some limited time specified by the manufacturer when called upon to do so. Level 4 autonomous control requires no driver attention for safety and a driver can even leave a driver's seat. Self-driving is supported only in limited spatial areas that may be geofenced or under special circumstances, like traffic jams. Level 5 autonomy is "steering wheel optional" autonomy. This includes true driverless vehicles that do not require a human.

Autonomous and semi-autonomous vehicles may use HD maps and an understanding of the context (e.g., traffic, weather, road construction, intersections, etc.) to help navigate and to control a vehicle along its path. In an instance in which a vehicle is subject to complete or partial autonomous control, hazard warnings associated with an intersection may inform the vehicle enabling appropriate actions to be taken. Those actions may include autonomous braking of a vehicle, autonomous steering of a vehicle, autonomous acceleration of a vehicle, etc. to avoid any unsafe situations.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for aggregating probe data to detect a road work event and generating, from the road work event, a work zone map overlay to inform navigational systems and autonomous vehicles. For example, the computing device may be a mobile terminal, such as a personal digital assistant (PDA), mobile telephone, smart phone, personal navigation device, smart watch, tablet computer, camera, or any combination of the aforementioned and other types of voice and text communications systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), Light Distancing and Ranging (LiDAR) sensor, humidity sensor, image capture sensor, precipitation sensor, accelerometer, and/or gyroscope. Any of the sensors may be used to sense information regarding the movement, positioning, or orientation of the device and for determining a weather condition at the location of the device as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 26, and/or the like).

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

According to certain embodiments, the apparatus 20 may support a mapping or navigation application so as to present maps or otherwise provide navigation or driver assistance. In order to support a mapping application, the computing device may include or otherwise be in communication with a geographic database, such as may be stored in memory device 26. For example, the geographic database includes node data records, road segment or link data records, point of interest (POI) data records, and other data records. More, fewer, or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LIDAR, ultrasonic and/or infrared sensors.

In example embodiments, a user device user interface and/or navigation system user interface may be provided to provide information or driver assistance to a user traveling along a network of roadways. Devices and systems may receive an indication of a current location of the user, and any location-based warnings such as approaching intersections with the current location of the device and user. While a service provider may be specifically configured to provide location-based information to a user, such a service may be enhanced or improved through cooperation with other service providers that independently determine location-based warnings associated with intersections.

According to example embodiments, map service provider database may be used to provide driver assistance via a navigation system or in conjunction with autonomous vehicle control. FIG. 2 illustrates a communication diagram of an example embodiment of a system for implementing example embodiments described herein using a navigation system and a map data service provider. The illustrated embodiment of FIG. 2 includes a mobile device 104, which may be, for example, the apparatus 20 of FIG. 1, such as a mobile phone, an in-vehicle navigation system, or the like, an original equipment manufacturer (OEM) 114, and a map data service provider or cloud service 108. Each of the mobile device 104, OEM 114, and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The OEM 114 may include a server and a database configured to receive probe data from vehicles or devices corresponding to the OEM. For example, if the OEM is a brand of automobile, each of that manufacturer's automobiles (e.g., mobile device 104) may provide probe data to the OEM 114 for processing. That probe data may be encrypted with a proprietary encryption or encryption that is unique to the OEM. The OEM may be the manufacturer or service provider for a brand of vehicle or a device. For example, a mobile device carried by a user (e.g., driver or occupant) of a vehicle may be of a particular brand or service (e.g., mobile provider), where the OEM may correspond to the particular brand or service. The OEM may optionally include a service provider to which a subscriber subscribes, where the mobile device 104 may be such a subscriber. While depicted as an OEM 114 in FIG. 2, other entities may function in the same manner described herein with respect to the OEM. As such, the OEM 114 illustrated in FIG. 2 is not limited to original equipment manufacturers, but may be any entity participating as described herein with respect to the OEMs.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data or location-based road work event data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region. These vehicles or probes may be embodied by mobile device 104 and may provide data to the map data service provider in the form of traffic speed/congestion data, weather information, location, speed, direction, etc.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

The OEM 114 may be configured to access the map database 110 via the processing server 102 through, for example, a mapping application, such that the user equipment may provide navigational assistance to a user among other services provided through access to the map data service provider 108. According to some embodiments, the map data service provider 108 may function as the OEM, such as when the map data service provider is a service provider to OEMs to provide map services to vehicles from that OEM. In such an embodiment, map data service provider 108 may or may not be the recipient of vehicle probe data from the vehicles of that manufacturer. Similarly, the map data service provider 108 may provide services to mobile devices, such as a map services provider that may be implemented on a mobile device, such as in a mapping application. According to such an embodiment, the map data service provider 108 may function as the OEM as the map developer receives the probe data from the mobile devices of users as they travel along a road network.

As mentioned above, the map data service provider 108 map database 110 may be a master geographic database, but in alternate embodiments, a client-side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments. An embodiment implemented as an ADAS may at least partially control autonomous or semi-autonomous features of a vehicle with the assistance of establishing the vehicle.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Driver assistance information may be communicated to a user via a display, such as a display of user interface 28 of apparatus 20 of FIG. 1. The display may be a display of a mobile phone, or a screen of an in-vehicle navigation system, for example. In the presentation of the driver assistance information to the user it is important that the information is communicated clearly and in an easily understood manner such that a user may quickly understand the information presented. As a user of a navigation system may be driving a vehicle, it is important that the navigation information including driver assistance information is quickly and easily understood, without requiring substantial user interaction should additional information be needed by the driver.

Map information and dynamic content are provided in some embodiments by service providers, such as map data service provider 108 of FIG. 1. These services collect probe data from probe apparatuses embodied by connected vehicles with various configurations of sensor arrays and aggregated the collected probe data to build high definition (HD) maps with road segment resolution down to, in some embodiments, centimeters, for an ADAS to support autonomously controlled vehicles. The sensor data of the probe data collected from vehicles traveling within the road network includes LiDAR, radar, ultrasonic sensors, cameras, geolocation, etc. Generally, ADAS dynamic content services include real time traffic, hazard warning, road signs, safety cameras, on-street parking, etc. Using backend sensor data from the probe apparatus vehicles and advanced wireless technologies (e.g., 4G and/or 5G or subsequent iterations), autonomous vehicle control can be improved through greater awareness of dynamic environmental factors.

Example embodiments provided herein provide a method for management of autonomous vehicles at unsignalized intersections, and more particularly, to improve the safety of unsignalized intersections using vehicle sensor information and safe stop data for vehicles approaching the unsignalized intersection. Mobile devices, such as mobile device 104 may be associated with a particular service provider (e.g., OEM 114 and/or map data service provider 108) where dynamic information such as vehicle-to-cloud events are communicated from that particular service provider to the mobile device, and used by the mobile device to present relevant information on a user interface and/or to inform vehicle automation regarding other vehicles on the road network. Individually, these service providers may have limited knowledge of dynamic conditions throughout a road network and may not individually have a complete understanding of traffic approaching an intersection. Individual service providers typically receive dynamic information reports only from mobile devices affiliated with the respective service provider (e.g., as a subscriber). This limits the dynamic information available to a service provider. The limited information available to each service provider results in different dynamic information including road work events and associated work zones.

Embodiments described herein include a method for managing vehicles at an intersection through aggregation of probe data from a variety of service providers and communicating information to vehicles at or approaching an intersection via network communication, such as via 5G communication. Embodiments determine safe stop distances and/or times for a vehicle approaching an intersection and send warning notifications to intersection management control when the vehicle stop distance, from the current driving speed to a full stop, is greater than the distance of the vehicle to the intersection. Such warning messages can be provided to vehicles approaching the intersection.

According to an example embodiment, probe data is obtained from vehicles traveling within a road network. The probe data includes a variety of data generated by a vehicle, including at least a location and a timestamp. The location may be identified, for example, by a GPS reading, near field communication locating methods, or any combination of locating means. The probe data of embodiments described herein further includes a vehicle speed and heading. The probe data can be map matched to a map of a road network such that vehicles approaching intersections can be identified based on the probe data.

A safe stopping distance is determined for vehicles approaching an intersection. The safe stopping distance can be ascertained through a variety of methods. A safe stopping distance is the shortest distance a vehicle can come to a complete stop from their current speed. The safe stopping distance is determined by the system, such as the map services provider 108, for use in management of an intersection. As vehicles differ in terms of capability including stopping distance, and as the speed of a vehicle directly impacts the stopping distance of the vehicle, the safe stopping distance can be different for each vehicle. A vehicle may report, in probe data, a distance that would be required for that vehicle to stop from the current speed of that vehicle. This can be determined, for example, by a manufacturer of the vehicle through testing, or through learning by the vehicle that has been performed over the course of a variety of stopping events at different levels of braking. This safe stopping distance can be incorporated into a probe data point, where the safe stopping distance is information contained in a probe data point and corresponds to the speed associated with that probe data point.

Optionally, embodiments of probe data may be used to calculate a safe stopping distance. Probe data points can include information associated with a vehicle of the probe apparatus, such as a type of vehicle (e.g., compact car, mid-size car, large car, compact sport utility vehicle (SUV), mid-size SUV, large SUV, compact pickup truck, etc.), a vehicle manufacturer, a vehicle model, etc. The type of vehicle or specific make/model can be used by example embodiments to estimate the safe stopping distance of the vehicle. A manufacturer may publish stopping distances from different speeds such that a database may be used to determine a safe stopping distance of a vehicle. For less specific information, such as a type of vehicle, a conservative estimate of a safe stopping distance may be estimated based on the average stopping distance or maximum stopping distance of vehicles of the same type. The stopping distance may be impacted by a status of a vehicle, such as a truck that is loaded may have a significantly higher weight than an unladen truck, and the safe stopping distance may be affected. Probe data as described herein can include a vehicle weight or vehicle weight estimate, that may be generated based on learning of a vehicle (e.g., how much energy is used to accelerate the vehicle to a particular speed) or from gauges on suspension components that can provide the sprung mass of the vehicle. The weight can be used as a weighting factor for increasing or decreasing a safe stopping distance estimate.

The safe stopping distance, obtained from a vehicle or calculated/estimated for a vehicle can further be influenced by other factors. A safe stopping distance may increase in inclement weather, and may increase by different degrees depending upon a type of inclement weather. For example, a safe stopping distance may increase by 25% in moderate rain (e.g., ¼-inch per hour), and 50% in heavy rain (e.g., 1-inch per hour). A safe stopping distance may increase by 50% or more in snow. When ice is a factor, a safe stopping distance may not be able to be calculated as the lack of friction renders the determination of a stopping distance unfeasible.

Systems of example embodiments receive probe data from vehicles traveling along the road network and are able to track paths of vehicles along the road network. Intersection data from the road network is determined from the map data, such as from HD map data. According to certain embodiments, contextual data is also collected, such as weather data, traffic data, and other dynamic road segment data. The probe data from vehicles, including autonomous and semi-autonomous vehicles, is map matched on a lane level based on the map data and the intersection map artifacts within the road network. Probe data is also collected from non-autonomous vehicles. While example embodiments described herein can cause autonomous vehicles to take action automatically based on potential safety concerns at intersections, information from non-autonomous vehicles can contribute to the safety concerns, and may be subject of the safety concern for which other vehicles are warned. Further, certain embodiments provide warnings to manually driven vehicles to allow a driver of such a vehicle to take any necessary precautions based on safety concerns identified at specific intersections.

Using the probe data collected from vehicles traveling within the road network, embodiments identify vehicles approaching intersections where their respective safe stopping distance exceeds the respective vehicle's distance from the intersection. As described above, individual vehicles may determine safe stopping distance and possible time to stop a vehicle. This determination can be made regardless of whether there is a control sign (e.g., stop, yield, etc.) at the intersection along the driving direction in given traffic conditions, weather conditions, speed limit information, etc.

Based on a determination made that a vehicle is approaching an intersection and cannot safely stop before entering the intersection, a warning message is triggered. This warning message can be provided to an intersection management control device, such as through 5G communication, whenever the safe vehicle stop distance is greater than the distance of a particular vehicle from an intersection. Optionally, instead of or in addition to safe stopping distance, a safe stopping time can be determined, where by a time to stop a vehicle is established based on a current speed, and when a vehicle will enter an intersection in a time that is less than the safe stopping time of the vehicle, it is presumed that the vehicle is entering the intersection and a warning can similarly be triggered.

The warning message provided to an intersection management control device can be handled in several ways. For example, an intersection management control device can provide visual and/or audible warnings proximate the intersection. This may be particularly beneficial to non-automotive related traffic at the intersection, such as pedestrians, cyclists, etc. When a vehicle is approaching an intersection and is closer to the intersection than a safe stopping distance, a warning provided at the intersection can alert pedestrians and others at the intersection that a vehicle will be entering the intersection. This can be in the form of lights (e.g., flashing lights) or sounds (e.g., an alarm) that quickly and unequivocally indicates a safety concern at the intersection.

The warning message provided to an intersection management control device can optionally be used to trigger traffic control devices. For example, in a signaled intersection, traffic lights can be changed despite signal phase and timing to account for a vehicle approaching the intersection that is determined to be entering the intersection. In an unsignalized intersection, warnings can be provided in the form of flashing lights, a dynamic sign that is illuminated with the warning, etc. Further, the intersection management control device can provide a signal to vehicles approaching or at the intersection. Such a signal can include a message communicated, such as by 5G standards, near-field communication (when vehicles are sufficiently close to an intersection or intersection management control device), or other communication protocol. The message can be received by a vehicle and action take.

In the case of an autonomous or semi-autonomous vehicle, an action taken responsive to a message from an intersection management control device may be taken automatically, without occupant interference. Such action may include, for example, slowing of the vehicle, stopping of the vehicle, holding at an intersection until the safety concern is past, accelerating out of an intersection (e.g., when a vehicle is already in the intersection), or the like. In lieu of or in addition to causing autonomous vehicle control, a message received by a vehicle can communicate the warning to a driver or occupant of the vehicle. The warning may enable a driver to take any necessary action to avoid the safety concern in a manner similar to the autonomous vehicle control. A driver may be instructed to stop, wait, slow, or accelerate, for example.

According to some embodiments, a map data service and dynamic content provider, such as map data service provider 108, can provide a warning message as dynamic content to vehicles approaching an intersection in lieu of or in addition to an intersection management control device. The map data service and dynamic content provider can communicate with vehicles approaching the intersection in the same manner as described above to help avoid safety issues within the intersection.

In addition to identifying safety hazards of vehicles approaching intersections that are determined to be unable to stop before entering the intersection, embodiments can further aide in safe traversal of intersections where there may be vehicles each ceding right of way to other vehicles at the intersection. In the case of unsignalized intersections, vehicles at an intersection, particularly those that are semi-autonomously or fully-autonomously controlled may be configured to cede right of way in many cases, which can pose an issue when each vehicle is ceding right of way. While conceding the right-of-way to vehicles and non-motorists in the intersection is reasonable, there can become a deadlock at an intersection in the case of multiple autonomous vehicles arriving at an intersection at substantially similar times from different directions. Each autonomous vehicle may simultaneously wait for another autonomous vehicle to start moving as the result of higher probability that each autonomously driven vehicle is taking a conservative driving strategy.

Embodiments described herein assign a priority crossing the intersection to each vehicle at an intersection by intersection management control devices. One such solution is to assign the priority to autonomous vehicles at the intersection from highest priority to lowest priority based on driving direction (e.g., East, South, West, North). Optionally, intersection priority can be given to a direction from which the heaviest traffic flow is determined by traffic control devices. Such priority can help alleviate the highest volume of traffic while maintaining order at the unsignalized intersection.

Embodiments can employ the same intersection control principles when there are turn lanes at an intersection. Further, the same notification warning generation strategy described above can be applied on highway entrance ramps and exit ramps given some decision rule modifications with the HD map support.

While safe stopping distance has been described above in terms of vehicles and vehicle-based calculations, embodiments described herein further include calculation of a safe stopping distance factoring in elements outside of hardware/vehicle specifics. Generally, a vehicle stopping distance is the sum of the perception-reaction distance plus the braking distance, which depends on the vehicle speed, road conditions, vehicle conditions, vehicle surrounding environment driving conditions, etc. Equation (1) represents a vehicle total stopping distance equaling the vehicle perception distance plus the vehicle braking distance.

$$D_{total} = D_{perception} + D_{braking} \quad (1)$$

Equation (2) represents vehicle driver perception distance. Where v is the current vehicle driving speed $T_{p-r}$ is vehicle driver reaction time, in general set as 1.5 seconds, but subject to change based on driver age and health conditions, with a worst case being about 2.5 seconds, to specifically accommodate very elderly, debilitated, intoxicated, or distracted drivers.

$$D_{perception} = v * T_{p-r} \quad (2)$$

Equation (3) reflects braking distance that references the distance a vehicle will travel from the point when brakes are fully applied to when it comes to a complete stop.

$$D_{braking} = \frac{v^2}{2\mu g} \quad (3)$$

Where v is the current driving speed, µ is the friction coefficient, generally around 0.7 subject to tire, brake, and road surface conditions, g is the gravity constant. Under inclement weather conditions, the braking distance can be longer than normal conditions. For example, braking distance can double under rainy conditions, and increase by as much as ten times or longer under snowy or icy conditions.

FIG. 3 is a table illustrating braking distance under different conditions. This table reflects the general car full stop distance under different weather conditions. Distances will vary between drivers, vehicle conditions (e.g., tire/brake condition, weight, etc.) and road conditions. FIG. 4 is a table illustrating a general truck full stop (safe stopping distance) under different weather conditions. As with FIG. 3, the distances are subject to change for different drivers, vehicle conditions (e.g., tire/brake, condition, weight, etc.), and road conditions.

FIG. 5 illustrates a safe stopping distance or full stop distance example when a vehicle is traveling at a speed of 40 kilometers per hour (kph) under normal (dry) weather conditions. In a review of the table of FIG. 3, the full stop distance is 36 meters. When the car 210 arrives at a point 220 that is 36 meters (shown as 230) from the intersection at 40 kph, the car can no longer safely stop before entering the intersection. At such a point, the warning message is generated and sent. As detailed above, this warning message can be generated by an intersection control management system or a map data service provider, for example. This warning message can be provided to other vehicles approaching, at, or within the intersection regardless of direction of approach/departure.

According to some embodiments, when available, the intersection management control or map data service provider can use a camera, LiDAR, or other sensor technologies available at the intersection to estimate or calculate vehicle driving speed or receive the vehicle speed from a backend server as described above. The intersection control center or map data service provider can generate the warning message when the vehicle arrives at the point within which a safe stop ahead of the intersection is no longer possible as depicted in FIG. 5.

FIGS. 6 and 7 are a flowcharts illustrative of methods according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 6 illustrates a flowchart of a method for improving the safety of intersections using vehicle sensor information and safe stop data for vehicles approaching the intersection. As illustrated, available vehicle sensor data is received from vehicles proximate an intersection and the road segments approaching the intersection at 310. The vehicle sensor data may be generated, for example, by vehicles embodied by mobile devices 104 and/or embodied as apparatus 20 of FIG. 1. Map data, weather data, and traffic data are retrieved at 320 to determine conditions at the intersection and the surrounding road segments. This data may be retrieved by map data service provider 108 and gathered from a variety of sources as needed. Optionally, the map data service provider 108 may determine traffic data from probe data traveling within the road network, and the map data may be stored locally, such as in map database 110. One or more vehicles associated with the vehicle sensor data may be map-matched at 330 to determine a respective lane of a vehicle and a respective speed of the vehicle. From the speeds and information associated with a vehicle, a safe stopping distance is determined at 340. This safe stopping distance may be provided by the vehicle, or calculated by embodiments described herein as detailed above. A warning message is then generated at 350 when a vehicle of the one or more vehicles is determined to be closer to the intersection than the safe stopping distance for that vehicle, indicating that the vehicle is going to enter the intersection.

FIG. 7 illustrates another method to improve the safety of intersections using vehicle sensor information and safe stop data for vehicles approaching the intersection. Probe data is received at 410 for probes representing vehicles proximate an intersection between two or more road segments. A first vehicle approaching the intersection is identified at 420 from the probe data. As illustrated, a safe stopping distance for the first vehicle approaching the intersection is determined at 430, where the safe stop distance includes a distance to stop the first vehicle from a current speed of the first vehicle. A warning message is generated at 440 in response to the safe stop distance being greater than a distance of the first vehicle from the intersection. The warning message is provided to one or more other vehicle approaching, at, or within the intersection at 450. The warning message may be provided by a map data service provider (e.g., map data service provider 108 of FIG. 2) or an intersection control system, for example. The one or more other vehicles approaching, at, or within the intersection are caused to take action responsive to the warning at 460. The action can include, for example, stopping, waiting, accelerating, etc.

In an example embodiment, an apparatus for performing the methods of FIGS. 6 and/or 7 above may include a processor (e.g., the processor 24) configured to perform some or each of the operations (310-350 and/or 410-460) described above. The processor may, for example, be configured to perform the operations (310-350 and/or 410-460) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-350 and/or 410-460 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:

receive probe data from probe apparatuses proximate an intersection between two or more road segments;

identify a first vehicle approaching the intersection from the probe data;

determine, for the first vehicle approaching the intersection, a safe stop distance, wherein the safe stop distance comprises a distance to stop the first vehicle from a current speed of the first vehicle;

generate a warning message in response to the safe stop distance of the first vehicle being greater than a distance of the first vehicle from the intersection;

provide the warning message to one or more other vehicles approaching, at, or within the intersection, wherein the warning message provides an indication that the first vehicle cannot safely stop before entering the intersection; and cause the one or more other vehicles approaching, at, or within the intersection to take action responsive to the warning.

2. The apparatus of claim 1, causing the one or more other vehicles approaching, at, or within the intersection to take action responsive to the warning comprises causing the one or more other vehicles to perform at least one of: stopping before entering the intersection, accelerating out of the intersection, slow before entering the intersection, or waiting at the intersection for the first vehicle to traverse the intersection.

3. The apparatus of claim 1, wherein causing the apparatus to determine, for the first vehicle approaching the intersection, the safe stop distance, comprises causing the apparatus to:

determine weather conditions proximate the intersection; and determine, for the first vehicle approaching the intersection, the safe stop distance based, at least in part, on the weather conditions proximate the intersection.

4. The apparatus of claim 1, wherein causing the apparatus to determine, for the first vehicle approaching the intersection, the safe stop distance, comprises causing the apparatus to:

determine the safe stop distance for the first vehicle approaching the intersection based on maximum applied braking for the first vehicle.

5. The apparatus of claim 1, wherein causing the apparatus to determine, for the first vehicle approaching the intersection, the safe stop distance, comprises causing the apparatus to:

determine, for the first vehicle, information associated with the first vehicle; and determine, based on the information associated with the first vehicle, the safe stop distance for the first vehicle.

6. The apparatus of claim 5, wherein the information associated with the first vehicle comprises at least one of: vehicle type, vehicle model, vehicle weight, or vehicle load status, wherein causing the apparatus to determine, based on the information associated with the first vehicle, the safe stop distance for the first vehicle, comprises causing the apparatus to determine the safe stop distance from a database using the information associated with the first vehicle.

7. The apparatus of claim 1, wherein causing the apparatus to provide the warning message to one or more other vehicles approaching, at, or within the intersection, comprises causing the apparatus to:

activate a traffic control device proximate the intersection to inform the one or more other vehicles approaching the intersection of the warning message.

8. A computer program product comprising at least one non-transitory computer-readable storage medium having computer-executable program code instructions stored therein, the computer-executable program code instructions comprising program code instructions to:

receive probe data from probe apparatuses proximate an intersection between two or more road segments;

identify a first vehicle approaching the intersection from the probe data;

determine, for the first vehicle approaching the intersection, a safe stop distance, wherein the safe stop distance comprises a distance to stop the first vehicle from a current speed of the first vehicle;

generate a warning message in response to the safe stop distance of the first vehicle being greater than a distance of the first vehicle from the intersection;

provide the warning message to one or more other vehicles approaching, at, or within the intersection, wherein the warning message provides an indication that the first vehicle cannot safely stop before entering the intersection; and cause the one or more other vehicles approaching, at, or within the intersection to take action responsive to the warning.

9. The computer program product of claim 8, the program code instructions to cause the one or more other vehicles approaching, at, or within the intersection to take action responsive to the warning comprise program code instructions to cause the one or more other vehicles to perform at least one of: stopping before entering the intersection, accelerating out of the intersection, slow before entering the intersection, or waiting at the intersection for the first vehicle to traverse the intersection.

10. The computer program product of claim 8, wherein the program code instructions to determine, for the first vehicle approaching the intersection, the safe stop distance, comprise program code instructions to:

determine weather conditions proximate the intersection; and determine, for the first vehicle approaching the intersection, the safe stop distance based, at least in part, on the weather conditions proximate the intersection.

11. The computer program product of claim 8, wherein the program code instructions to determine, for the first vehicle approaching the intersection, the safe stop distance, comprise program code instructions to:

determine the safe stop distance for the first vehicle approaching the intersection based on maximum applied braking for the first vehicle.

12. The computer program product of claim 8, wherein the program code instructions to determine, for the first vehicle approaching the intersection, the safe stop distance, comprise program code instructions to:

determine, for the first vehicle, information associated with the first vehicle; and determine, based on the information associated with the first vehicle, the safe stop distance for the first vehicle.

13. The computer program product of claim 12, wherein the information associated with the first vehicle comprises at least one of: vehicle type, vehicle model, vehicle weight, or vehicle load status, wherein the program code instructions to determine, based on the information associated with the first vehicle, the safe stop distance for the first vehicle, comprise program code instructions to determine the safe stop distance from a database using the information associated with the first vehicle.

14. The computer program product of claim 8, wherein the program code instructions to provide the warning message to one or more other vehicles approaching, at, or within the intersection, comprise program code instructions to:

activate a traffic control device proximate the intersection to inform the one or more other vehicles approaching the intersection of the warning message.

15. A method comprising:
- receiving probe data from probe apparatuses proximate an intersection between two or more road segments;
- identifying a first vehicle approaching the intersection from the probe data;
- determining, for the first vehicle approaching the intersection, a safe stop distance, wherein the safe stop distance comprises a distance to stop the first vehicle from a current speed of the first vehicle;
- generating a warning message in response to the safe stop distance of the first vehicle being greater than a distance of the first vehicle from the intersection;
- providing the warning message to one or more other vehicles approaching, at, or within the intersection, wherein the warning message provides an indication that the first vehicle cannot safely stop before entering the intersection; and
- causing the one or more other vehicles approaching, at, or within the intersection to take action responsive to the warning.

16. The method of claim 15, causing the one or more other vehicles approaching, at, or within the intersection to take action responsive to the warning comprises causing the one or more other vehicles to perform at least one of: stopping before entering the intersection, accelerating out of the intersection, slow before entering the intersection, or waiting at the intersection for the first vehicle to traverse the intersection.

17. The method of claim 15, wherein determining, for the first vehicle approaching the intersection, the safe stop distance, comprises:
- determining weather conditions proximate the intersection; and
- determining, for the first vehicle approaching the intersection, the safe stop distance based, at least in part, on the weather conditions proximate the intersection.

18. The method of claim 15, wherein determining, for the first vehicle approaching the intersection, the safe stop distance, comprises:
- determining, for the first vehicle, information associated with the first vehicle; and
- determining, based on the information associated with the first vehicle, the safe stop distance for the first vehicle.

19. The apparatus of claim 1, wherein the one or more other vehicles are traveling along one or more paths that cross a path of the first vehicle through the intersection.

20. The apparatus of claim 19, wherein the intersection is an unsignaled intersection.

* * * * *